A closure device for a carton having a gable top. The device

United States Patent [19]

Wald

[11] Patent Number: 5,518,173
[45] Date of Patent: May 21, 1996

[54] REUSABLE CLOSURE DEVICE FOR CARTONS HAVING GABLE TOPS

[76] Inventor: Hy Wald, P.O. Box 637, Ft. Washington, Pa. 19034

[21] Appl. No.: 310,554

[22] Filed: Sep. 22, 1994

[51] Int. Cl.[6] ..................................... B65D 43/22
[52] U.S. Cl. ..................... 229/125.39; 292/343
[58] Field of Search .................. 229/125.37, 125.39, 229/198.1, 137; 292/1, 343

[56] References Cited

U.S. PATENT DOCUMENTS

| | | | |
|---|---|---|---|
| 2,032,880 | 3/1936 | Kinsley et al. | 229/125.39 |
| 2,548,705 | 4/1951 | Collier et al. | 229/125.37 |
| 3,226,008 | 12/1965 | Chiorri | 229/198.1 |
| 4,078,716 | 3/1978 | Harley et al. | 229/198.1 |
| 4,210,274 | 7/1980 | Leonard | 229/198.1 |
| 4,611,429 | 9/1986 | Kanies | 292/343 X |
| 4,757,909 | 7/1988 | Matsuura | 229/198.1 X |
| 4,801,078 | 1/1989 | Carlsson | 229/125.37 X |
| 4,979,668 | 12/1990 | Allen et al. | 229/125.39 |
| 5,024,375 | 6/1991 | Wright | 229/125.39 |

*Primary Examiner*—Allan N. Shoap
*Assistant Examiner*—Christopher J. McDonald
*Attorney, Agent, or Firm*—Caesar, Rivise, Bernstein, Cohen & Pokotilow, Ltd.

[57] ABSTRACT

A closure device for a carton having a gable top. The device comprises a flanged cap including a pair of inner surfaces defining a longitudinal slot. The device further includes inclined side walls extending from the flanged cap and adapted to make a snug fit with the gable top. The device further includes front and rear walls contiguous with the inclined side walls and angled side walls adjacent the inclined side walls extending from the rear wall toward the front wall. The inclined side walls and angled side walls are spaced a distance apart to define a recess. The carton comprises a pair of vertical strips have an upper and lower edge, and inclined sidewalls extending outwardly and downwardly from the lower edge of the vertical strips. The strips have inner and outer surfaces. The inner surfaces of the strips are sealed together along their longitudinal length, so that when one end of the strips are pried apart, a pouring spout is formed for dispensing contents from the carton. The outer surfaces of the strips of the carton being slidingly disposed within the longitudinal slot in a confining relationship whereupon the inner surfaces forming the longitudinal slot hold the strips closed together and the inclined sidewalls of the carton are at least partially located within the recess. This protects the contents of the carton from spillage or the ingress of contaminants therein.

8 Claims, 4 Drawing Sheets

REUSABLE CLOSURE DEVICE FOR CARTONS HAVING GABLE TOPS

BACKGROUND OF THE INVENTION

This invention relates generally to an inexpensive device which may be applied to standard cartons to releasably close them after they have been opened, so that the contents are protected against odor, dust, dirt or other contaminants, and against spillage of the contents.

In recent years, the packaging materials for milk, fruit juices, and many other materials have changed from glass or plastic containers to heavy paper or cardboard cartons, particularly for half-gallon sizes or less. These cartons have gable tops, are often wax-impregnated or wax coated, and multi-layered strips at the top of the carton are heat sealed together to close the carton. By prying apart the strips at one side of the carton, a pouring spout is formed to easily dispense the contents from the carton.

After the desired amount of contents are dispensed, the spout may then be folded back inward. However, the closure is now imperfect since the heat seal on the pried portion of the strip is broken and the various layers of the strip are no longer in close contact with each other. Thus, the contents of the carton are subject to contamination by moisture, odors, dust, dirt and the like. Further, the contents of the carton may spill from the carton.

The present invention provides an inexpensive, easily applied, closure device for closing and protecting the contents of cartons after they have been opened. The closure device may be dimensioned to fit any standard size carton, i.e., one pint, one quart, one-half gallon, etc.

Previous devices for the closure of gable types of cartons have been incorporated in the carton design and have been manufactured and supplied with the carton. For example, U.S. Pat. No. 3,680,771 (Blunsdon), shows a closure device where the container includes a flap which folds over one of the top strips of the container with a spring clip inserted over the flap to provide the closure.

In U.S. Pat. No. 2,336,503 (Ringler) is disclosed a gable or bellows container sliding closure comprised of a slotted closure member which slides over the top strip of the container. Again, in this case, the containers are specifically designed to incorporate the closure mechanism, and the closure element is supplied with the container when the container is manufactured.

In U.S. Pat. No. 2,030,134 (Burgener) is disclosed a closure device for a flat top box which is employed where the contents are removed from the box by punching holes in the top of the box.

Other types of devices which utilize clip-type closures which have to be slipped onto or about the outer surfaces of the strips which define the opening in the gable top of the carton are shown in U.S. Pat. Nos. 3,381,883 (Harris), 3,458,110 (Goldman) and 3,463,380 (Cooperstein).

All of the foregoing problems were solved with my prior invention for a reusable closure device for cartons having gable tops, U.S. Pat. No. 4,646,961, the entire disclosure of which is incorporated by reference herein. That device also protects the contents of cartons having gable tops from odor, dust, dirt or other contaminants and from spillage after the carton is opened. The closure device is placed upon the carton and covers the top part of the carton. A longitudinal gap in the device encloses and presses together the top strips of the carton, which were pried apart to form a spout for dispensing the contents of the carton, thereby closing the carton. The device comprises a flanged cap with a pair of inner surfaces defining a longitudinal slot and included inclined side walls extending from the flanged cap and adapted to make a snug fit with the cap top, with there being front and rear walls extending downwardly from the flanged cap. Also, the front and rear walls extended between the inclined side walls, and there was a pair of skirts which extended from the lower edge of each of the inclined side walls and spanned the lower portions of the front and rear walls.

For larger cartons, the device incorporates a section for holding the carton with a handle for tilting the carton to dispense its contents. In one embodiment, the closure section of the device snaps onto the holding section to close the carton. In a second embodiment, the closure section is connected to the holding section by a hinge.

The closure device of my U.S. Pat. No. 4,646,961 has worked well. It need only be applied to the gable top without any special guidance or manipulation. However, I recognized a need to eliminate a considerable portion of the plastic used in a closure device, as well as a need to facilitate the gripping of a closure device from the end walls in lieu or of supplementary with grasping of the closure device along the top section or flanged cap or tab. Accordingly, in my second U.S. Pat. No. 4,793,549, the entire disclosure of which is incorporated by reference, is disclosed a modified reusable closure device for cartons for gable tops, which is similar to my prior invention. However, in this invention, the closure device possesses shortened inclined walls as well as end walls having a lower arcuate convex edge to facilitate a gripping by the fingers of a user. This device may be used with all standard types of containers and does not require any special container designs.

Other types of closure devices may be found in the following references: U.S. Pat. No. Des. 182,215 (Wilson), U.S. Pat. Nos. 2,533,539 (Vivian), 2,586,931 (Gammon), 2,647,524 (Heavens, Jr.), 2,896,812 (Paprocki), 2,906,439 (Santuci, Sr.), 3,217,967 (Jackson), 3,373,897 (Haines), 3,381,875 (Tunick), 3,488,078 (Cooperstein), 3,693,864 (Wilkins), 4,109,351 (Coffey), 4,323,188 (Dickerson), 4,498,585 (Gordon et al.), 4,588,081 (Newsome et al.) and 4,619,398 (Laramie); and Norwegian Patent No. 81,458.

Accordingly, a need exists for a reusable closure device for cartons having gable tops.

OBJECTS OF THE INVENTION

Accordingly, it is a general object of this invention to provide a closure device for a carton having a gable top which protects the contents of the carton from contamination or spillage after the carton has been opened, and which overcomes the disadvantages of the prior art.

It is another object of this invention to provide a closure device for a standard-sized, commercially available carton having a gable top.

It is a further objection of the invention to provide a closure device which is easily applied to and removed from a carton having a gable top.

It is yet a further object of the invention to provide a closure device for a carton having gable top which is reusable and therefore environmentally friendly.

It is yet another object of the present invention to provide a closure device which doubles as an advertising medium to promote name recognition, and build company and customer good will.

It is still yet another object of the present invention to provide a closure device which is versatile in being utilizable for cartons having gable tops in a wide variety of sizes, namely one-half pint to five pound, one gallon sizes.

SUMMARY OF THE INVENTION

These and other objects of this invention are achieved by providing a closure device for a carton having a gable top. The device comprises a flanged cap including a pair of inner surfaces defining a longitudinal slot. The device further includes inclined side walls extending from the flanged cap and adapted to make a snug fit with the gable top. The device further includes front and rear walls contiguous with the inclined side walls and angled side walls adjacent the inclined side walls extending from the rear wall toward the front wall. The inclined side walls and angled side walls are spaced a distance apart to define a recess. The carton comprises a pair of vertical strips have an upper and lower edge, and inclined sidewalls extending outwardly and downwardly from the lower edge of the vertical strips. The strips have inner and outer surfaces. The inner surfaces of the strips are sealed together along their longitudinal length, so that when one end of the strips are pried apart, a pouring spout is formed for dispensing contents from the carton. The outer surfaces of the strips of the carton being slidingly disposed within the longitudinal slot in a confining relationship whereupon the inner surfaces forming the longitudinal slot hold the strips closed together and the inclined sidewalls of the carton are at least partially located within the recess. This protects the contents of the carton from spillage or the ingress of contaminants therein.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
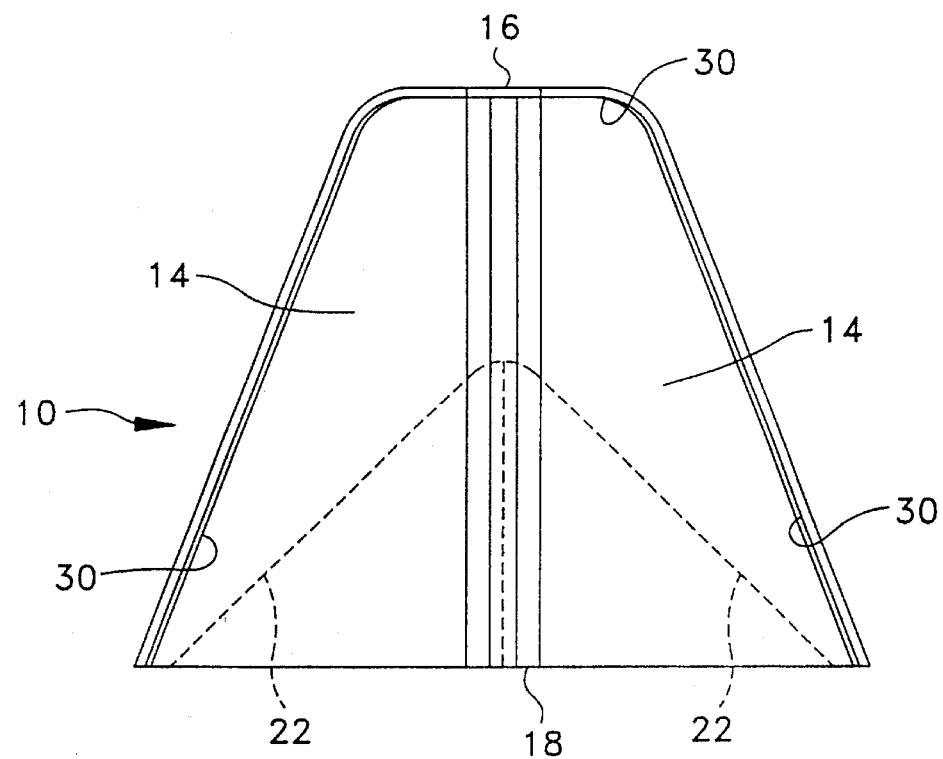
FIG. 1 is a top view of the closure device of the present invention, partially in phantom.
Figure 5:
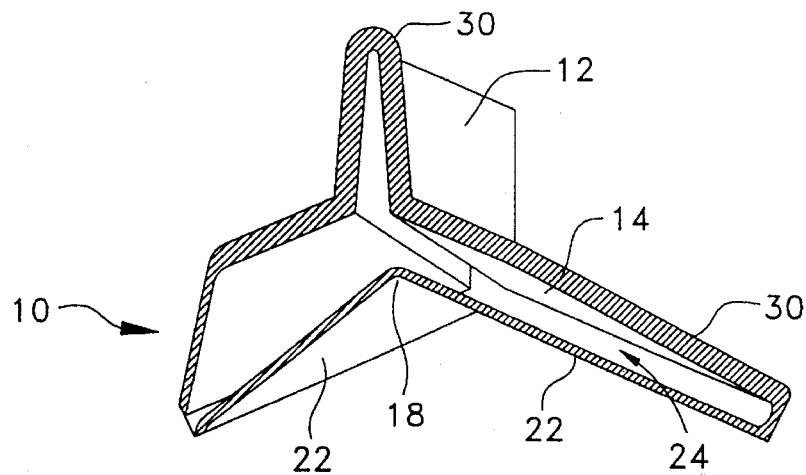
FIG. 5 is a perspective view of the device of the present invention.

Referring now to various figures of the drawings where like reference numerals refer to like parts, there is shown at 10 in FIGS. 1 and 5, a closure device constructed in accordance with this invention to be used with a conventional carton 40 (FIG. 7) having a gable top. The device 10 is arranged to be disposed over the gable top of a carton 40 to hold it closed, after the top is opened, to prevent the entry of contaminants, odors or air, while also preventing the contents in the carton from spilling.

Figure 2:
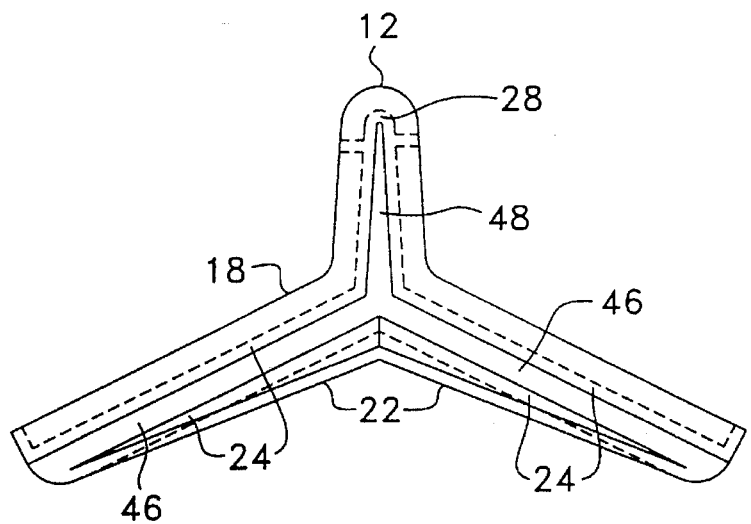
FIG. 2 is a rear view of the closure device shown in FIG. 1, releasably secured over the gable top of a container.
Figure 3:
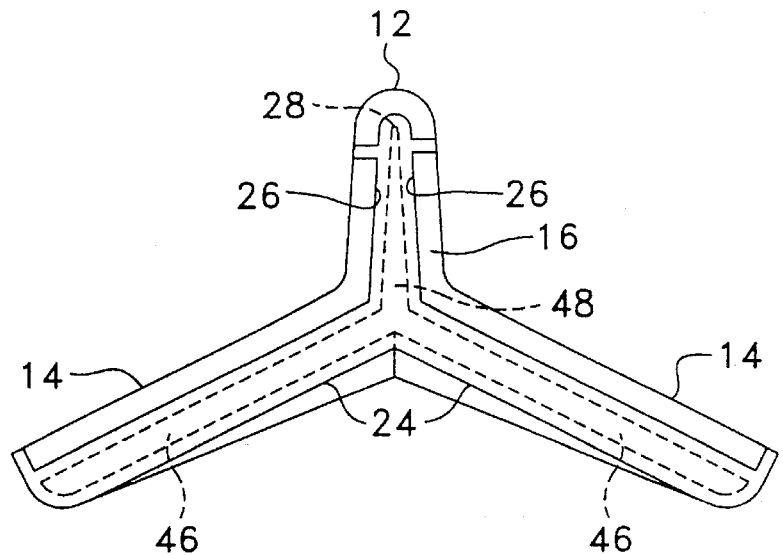
FIG. 3 is a front view of the closure device shown in FIG. 1, releasably secured over the gable top of a container.
Figure 4:
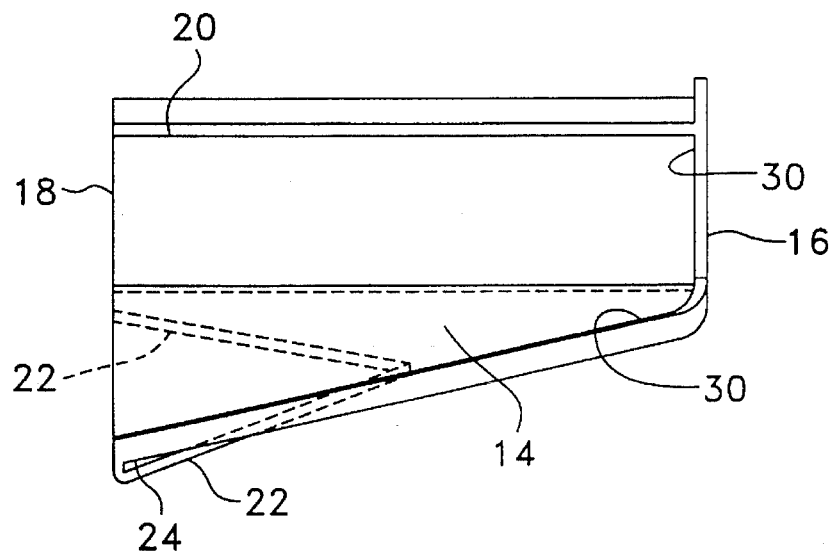
FIG. 4 is a right side view of the closure device shown in FIG. 1, partially in phantom, releasably secured over the gable top of a container.

The device 10 basically comprises a flanged cap or tab 12 (FIGS. 2 and 5) with a pair of inclined short side walls or wings 14. The device 10 includes contiguous front end wall 16 and rear end wall 18. As shown in FIG. 4, the flanged cap or tab 12 also includes gripping means 20, which in the preferred embodiment is a longitudinal flange extending perpendicularly to the flanged cap or tab 12. At the rear end 18 of the device 10, is a pair of forwardly extending inclined side walls 22 which create a space 24 (FIG. 3) to engage the front ends 50 of the inclined panels 46 of the container 40 as described below.

Figure 6:
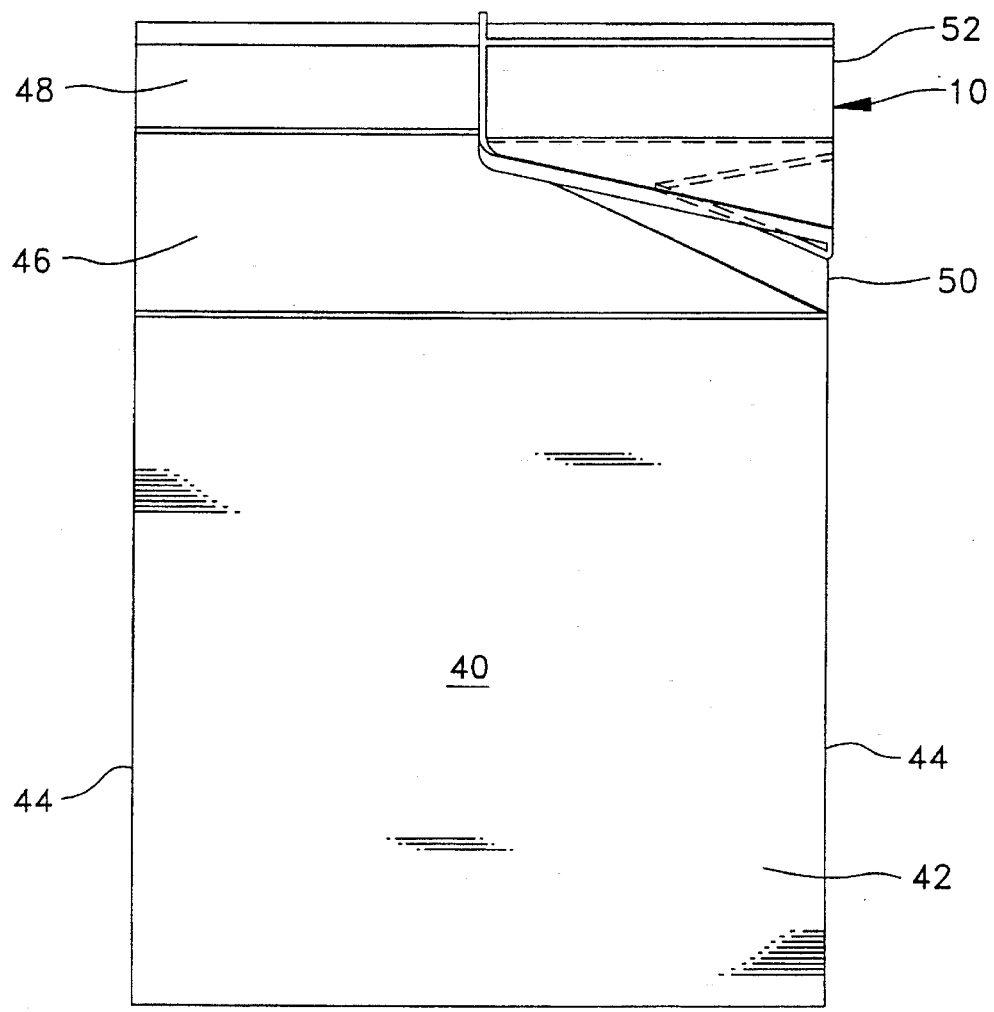
FIG. 6 is a side view of the device of the present invention shown covering a gable top carton.
Figure 7:
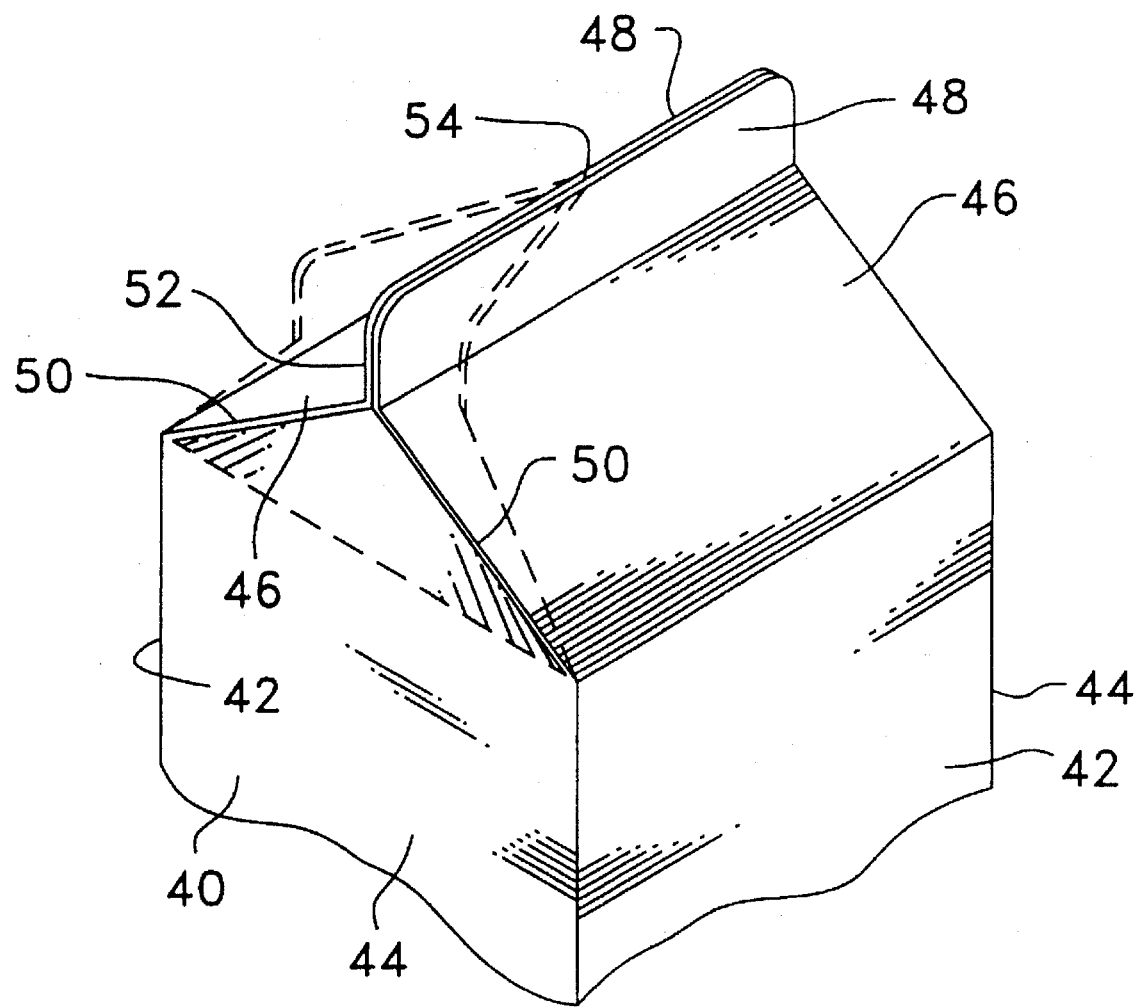
FIG. 7 is a perspective view of a container having a gable top which may be closed using the closure device of the present invention, partially in phantom.

The carton which may be closed utilizing the present invention is a standard carton 40 as shown in FIGS. 6 and 7, which is in prevalent use for holding milk, juices and other types of materials. Thus, the carton comprises a base (not shown), a pair of side walls 42, a front and back panel 44, and a pair of inclined panels 46 which terminate at their upper end in a pair of strips 48.

At the time the carton is manufactured, after the carton 40 is filled with its contents, the strips 48 are sealed together longitudinally along their length to close the carton. Usually a heat sealing technique is used.

As in conventional gable top cartons, to gain access to the contents of the carton, the user grasps the front ends 50 of the inclined panels 46 to pry apart the front end 52 of the strips 48 to separate them as shown by the phantom lines in FIG. 7. The strips 48 are double layer, so that a spout (not shown) may be formed by pulling back (outward) the inside layer of each of the strips 48. The carton contents may then be dispensed via the spout. After use, the inner layers of the strips 48 are pushed back so that they are again parallel with the outer layers of the strips 48. However, since the seal has been broken, a gap exists, whereby moisture, odors, dust, dirt and the like can contaminate the contents of the carton 40. Further, if the carton 40 is inadvertently tipped over, its contents may be spilled. When the closure device 10 is placed over a carton 40 which has been opened, it will close the carton 40 in a snug fit and protect the contents of the carton against contamination and spillage.

As shown in FIGS. 2–4 and 6, when the closure device 10 is placed upon the carton 40 by sliding the device 10 in a generally horizontal direction so that the vertical strips 48 of the top of the carton 40 are enclosed and held together by the interior surfaces 26 of the slot 28 in the closure device. Moreover, the short inclined walls 14 of the device 10 abut and rest upon the inclined panels 46 of the carton 40. Thus, it is seen that the closure device 12 slides and fits upon the top of the carton 40, and closes carton 40 by pressing vertical strips 48 together and guiding the same into the slot 28. Also, the pair of forwardly extending inclined side walls 22 which create recess 24 (FIG. 3) to engage the front ends 50 of the inclined panels 46 of the container 40, slide below the underside of inclined carton walls 46 until the front edges of the carton walls 46 reach the end wall 18 of the device at which point the forwardly extending inclined side walls 22 should reach approximately the midpoint 54 of the vertical strips 48 of the carton 40. By permitting the pair of forwardly extending inclined side walls 22 to engage the underside of inclined carton walls 46, the closure device 10 is releasably secured to the carton 40, so that when one attempts to lift the carton 40 by lifting the gripping means 20, the closure device 10 aids in lifting and moving the carton 40. In addition, the device includes a peripheral flange 30 to facilitate sliding the closure device 10 onto the carton 40 when the user's fingers abut the flange while placing or removing the device 10 from the carton 40.

In a preferred embodiment of the present invention, the longitudinal length of the device 10, e.g., of the inclined walls 14 and flanged cap 12, is approximately one-half the longitudinal length of vertical side walls 48 of the carton 40. The length of the In another embodiment of the present invention, the longitudinal length of the device 10 is approximately the full longitudinal length of vertical side walls 48 of the carton 40. This length may be varied depending upon the circumstances of use. The device 10 being of a shorter longitudinal length will be less expensive to manufacture due to the lesser costs for production materials such as plastic, as well as reduced shipping and storage costs for the smaller version. Intermediate length versions may also be utilized depending upon the circumstances of use.

The device 10 of the present invention may be comprised of any suitable low cost, yet strong and rugged material, such as a plastic, metal, composites and the like, depending upon the circumstances of use. The device may be easily manufactured by injection molding into a single piece and in other ways known in the art.

Closure device 10 may be sold to the general public for use by consumers to protect the contents of gable top cartons. Another possible method of distribution and sale of the device 10 would be as a "give-away" for advertising and promotional purposes. Thus, the wing or other surfaces of the cap may contain printed or stamped advertising indicia thereon. Additionally, as is not the case with the prior art, the present invention permits the embossing of advertising indicia thereon, for example, in on the inclined wings 14.

Without further elaboration the foregoing will so fully illustrate my invention that others may, by applying current or future knowledge, adapt the same for use under various conditions of service.

I claim:

1. A carton having a closing device, wherein the carton has a gable top, the carton comprising a pair of vertical strips having an upper and lower edge, and inclined sidewalls extending outwardly and downwardly from the lower edge of the vertical strips, the inclined sidewalls each having an upper and lower surface, the strips having inner and outer surfaces, the inner surfaces of the strips being sealed together along their longitudinal length, so that when one end of strips are pried apart, a pouring spout is formed for dispensing contents from the carton, wherein the closure device comprises (1) a flanged cap including a pair of inner surfaces, defining a longitudinal slot, the closure device further (2) including inclined sidewalls extending from the flanged cap and adapted to make a snug fit with the gable top, the closure device further including (3) front and rear walls contiguous with the inclined sidewalls, and angled sidewalls adjacent the inclined sidewalls extending from the rear wall towards the front wall, the inclined sidewalls and angled sidewalls being spaced apart to define a recess and wherein the outer surfaces of the carton strips are slidably disposed within the longitudinal slot defined by inner surfaces, with the strips of the carton being slidably disclosed within the longitudinal slot in a confining relationship such that the inner surfaces hold the strips together in a closed position and wherein the inclined sidewalls of the carton are at least partially located within the recess defined by the angled sidewalls of the carton, thereby protecting the contents of the carton from spillage or ingress of contaminants therein.

2. The closure device of claim 1, wherein the flanged cap has a longitudinal length which is approximately one-half the longitudinal length of the vertical strips of the carton.

3. The closure device of claim 1 wherein the flanged cap has a longitudinal length which is approximately equal to the longitudinal length of the vertical strips of the carton.

4. The device of claim 1 wherein the device is formed of a plastic material.

5. The device of claim 1 additionally comprising means for gripping the device to facilitate sliding of the device onto the carton.

6. The device of claim 5 wherein the gripping means comprises a longitudinal flange extending outwardly from both sides of the flanged cap.

7. The device of claim 5 wherein the gripping means comprises a peripheral flange extending from the front wall and inclined side walls.

8. The device of claim 6 wherein the gripping means comprises a peripheral flange extending from the front wall and inclined side walls.

* * * * *